US005688857A

United States Patent [19]

Chen et al.

[11] Patent Number: 5,688,857
[45] Date of Patent: Nov. 18, 1997

[54] POLYURETHANE-FORMING COLD-BOX BINDERS AND THEIR USES

[75] Inventors: Chia-hung Chen; James T. Schneider, both of Dublin, Ohio

[73] Assignee: Ashland Inc., Columbus, Ohio

[21] Appl. No.: 632,720

[22] Filed: Apr. 10, 1996

[51] Int. Cl.$^6$ .............................. C08L 75/04; B22C 1/22; B22C 9/02
[52] U.S. Cl. .......................... 524/590; 524/589; 523/139; 523/142
[58] Field of Search .................... 524/590, 589; 523/139, 142

[56] References Cited

U.S. PATENT DOCUMENTS

| 4,311,631 | 1/1982 | Myers et al. | 260/38 |
| 5,132,339 | 7/1992 | Carpenter et al. | 523/143 |
| 5,455,287 | 10/1995 | Carpenter et al. | 523/143 |

FOREIGN PATENT DOCUMENTS

| 3339174 | 5/1985 | Germany . |
| 1 203 943 | 9/1970 | United Kingdom . |
| WO 95/05409 | 2/1995 | WIPO . |

*Primary Examiner*—W. Robinson H. Clark
*Attorney, Agent, or Firm*—David L. Hedden

[57] ABSTRACT

This invention relates to polyurethane-forming cold-box binders and foundry mixes prepared with these binders. The binder comprises a polyol component and an organic polyisocyanate component. Foundry mixes are prepared by mixing the binder with a foundry aggregate. Foundry shapes (molds and cores) are prepared by shaping the mix and curing the foundry shape with a gaseous tertiary amine curing catalyst.

10 Claims, No Drawings

POLYURETHANE-FORMING COLD-BOX BINDERS AND THEIR USES

TECHNICAL FIELD

This invention relates to polyurethane-forming cold-box binders and foundry mixes prepared with these binders. The binder comprises a polyol component and an organic polyisocyanate component. Foundry mixes are prepared by mixing the binder with a foundry aggregate. Foundry shapes (molds and cores) are prepared by shaping the mix and curing the foundry shape with a gaseous tertiary amine curing catalyst.

BACKGROUND OF THE INVENTION

One of the major processes used in the foundry industry for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

One of the processes used in sand casting for making molds and cores is the cold-box process. In this process a gaseous curing agent is passed through a compacted shaped mix to produce a cured mold and/or core.

A phenolic-urethane binder system commonly used in the cold-box process is cured with a gaseous tertiary amine catalyst. See for example U.S. Pat. Nos. 3,409,579, 3,429,848, 3,432,457, and 3,676,392. The phenolic-urethane binder system usually consists of a phenolic resin component and poly-isocyanate component which are mixed with sand prior to compacting and curing to form a foundry mix. Such phenolic-urethane binders used in the cold-box process, have proven satisfactory for casting such metals as iron or steel which are normally cast at temperatures exceeding about 1400° C. They are also useful in the casting of light-weight metals, such as aluminum, which have melting points of less than 800° C.

There are disadvantages to using phenolic-urethane binders in the cold-box process. Both the phenolic resin component and polyisocyanate component generally contain a substantial amount of organic solvent which can be obnoxious to smell. Additionally, these binders contain small amounts of free formaldehyde and free phenol which may be undesirable. Because of this, there is an interest in developing binders which do not use organic solvents and do not contain free formaldehyde or free phenol.

Additionally, when the two components of the phenolic-urethane binder system are mixed with the sand to form a foundry mix, they may prematurely react prior to curing with the gaseous catalyst. If this reaction occurs, it will reduce the flowability of the foundry mix when it is used for making molds and cores, and the resulting molds and cores will have reduced strengths.

The bench life of the foundry mix is the time interval between forming the foundry mix and the time when the foundry mix is no longer useful for making acceptable molds and cores. A measure of the usefulness of the foundry mix and the acceptability of the molds and cores prepared with the foundry mix is the tensile strength of the molds and cores. If a foundry mix is used after the bench life has expired, the resulting molds and cores will have unacceptable tensile strengths.

Because it is not always possible to use the foundry mix immediately after mixing, it is desirable to prepare foundry mixes with an extended bench life. Many patents have described compounds which improve the bench life of a phenolic-urethane foundry mix. Among the compounds useful to extend the bench life of the foundry mix are organic and/or inorganic phosphorus containing compounds.

SUMMARY OF THE INVENTION

This invention relates to a polyurethane-forming cold-box binder comprising as separate components:

(1) a polyol component comprising a monomeric polyol having an average of at least two hydroxyl groups where at least one, preferably two, of said hydroxyl groups is a primary hydroxyl group and said primary hydroxyl group is separated by no more than four carbon atoms from another hydroxyl group; and (2) an organic polyisocyanate component;

wherein said binder is curable with a catalytically effective amount of a gaseous tertiary amine catalyst and components (1) and (2) are compatible with each other.

The foundry mixes are prepared by mixing components (1) and (2) with an aggregate. The foundry mixes are used to make molds and cores by the cold-box process which involves curing the molds and cores with a gaseous tertiary amine. The cured molds and cores are used to cast ferrous and non ferrous metal parts, and are particularly useful for casting aluminum parts.

The binders of the foundry mixes do not contain free formaldehyde or phenol and preferably do not use aromatic solvents. Thus the binders are odorless and create less stress to the environment than conventional phenolic-urethane binders.

The foundry mixes are acceptable for use because they have adequate benchlife, produce cores and molds with tensile strengths which can be handled under use conditions, and the cores and/or molds shakeout effectively after the casting is made. The binders can utilize current cold-box technology which does not force the customer to revamp existing equipment.

BEST MODE AND OTHER MODES OF PRACTICING THE INVENTION

The polyols, preferably monomeric polyols, used in the polyurethane-forming binder have an average of at least two hydroxyl groups where at least one, preferably two, hydroxyl group is a primary hydroxyl group and said primary hydroxyl group is separated by no more than four carbon atoms from another hydroxyl group. Examples of such monomeric polyols include ethylene glycol, 1,3-propane diol, and 1,2,4-butane diol, preferably ethylene glycol. Preferably the polyol contains water as a solvent such that the ratio of polyol to water is from 5 to 50 weight percent, preferably from 10 to 30 weight percent, where the weight percent is based upon the total weight of the polyol and water. Additionally the polyol component may contain a non aromatic solvent such as propylene carbonate, diethylene glycol monoether acetate, and butyrolactone in amounts of 5 to 50 weight percent based upon the weight of the polyol.

Although not necessarily preferred, minor amounts of secondary other hydroxyl containing compounds such as polyether polyols, polyester polyols, phenolic resin and/or amine-based polyols can be used. These other hydroxyl containing polyols are added in minor amounts. By minor amounts it is meant that less that 30 weight percent of the other hydroxyl compounds (phenolic resin, amine-based polyol, polyether polyol, or polyester polyol) is added based upon the weight of the primary polyol, usually less than 15 weight percent and preferably less than 5 weight percent, said weight percent based upon the weight of the primary polyol component.

Although not necessarily preferred, organic solvents may be added to the polyol component, particularly if the polyol component also contains a benzylic ether phenolic resin. The amount of solvent used is generally less than 30 weight percent, usually less than 15 weight percent, preferably less than 5 weight percent based upon the total weight of the polyol component.

Other optional ingredients which may be added to the polyol component include release agents and adhesion promoters, such as silanes, described in U.S. Pat. No. 4,540,724 which is hereby incorporated into this disclosure by reference, to improve humidity resistance.

Organic polyisocyanates used in the organic polyisocyanate component, which act as a hardener, are liquid polyisocyanates having a functionality of two or more, preferably 2 to 5. They may be aliphatic, cycloaliphatic, aromatic, or a hybrid polyisocyanate. Mixtures of such polyisocyanates may be used. The polyisocyanates should have a viscosity of about 100 to about 1,000, preferably about 200 to about 600.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the polyether polyol when cured with the liquid amine curing catalyst. In general the isocyanate ratio of the polyisocyanate to the hydroxyl of the polyol is from 1.20:1.0 to 0.80:1.0, preferably about 0.9:1.0 to 1.1:1.0, and most preferably about 1.0:1:0.

The polyisocyanate may also contain a bench life extender such as an acid chloride and or acid anhydride. Representative examples of acid chlorides which can be used include pthalolyl chloride, adipoyl chloride, sebacoyl chloride, cyanuric chloride, phenyl dichloro phosphate, and benzene phosphonic dichloride. Representative examples of acid anhydrides which can be used include maleic anhydride and chloracetic anhydride. The amount of acid containing compound used in the polyisocyanate component is generally from 0.01 to 3.0 weight percent, preferably 0.05 to 0.1 weight percent based upon the total weight of the binder. Other examples of benchlife extenders include organic phosphorus-containing compounds such as those disclosed in U.S. Pat. No. 4,436,881 which discloses certain organic phosphorus containing compounds such as dichloroarylphosphine, chlorodiarylphosphine, arylphosphinic dichloride, or diarylphosphinyl chloride, and U.S. Pat. No. 4,683,252 which discloses organohalophosphates such as monophenyldichlorophosphate. Examples of inorganic phosphorus-containing compounds which extend the bench life of phenolic-urethane binder systems are disclosed in U.S. Pat. No. 4,540,724 which discloses inorganic phosphorus halides such as phosphorus oxychloride, phosphorus trichloride, and phosphorus pentachloride, and U.S. Pat. No. 4,602,069 which discloses inorganic phosphorus acids such as orthophosphoric acid, phosphoric acid, hypophosphoric acid, metaphosphoric acid, pyrophosphoric acid, and polyphosphoric acid.

Drying oils, for example those disclosed in U.S. Pat. No. 4,268,425, may also be used in the polyisocyanate component. Drying oils may be synthetic or natural occurring and include glycerides of fatty acids which contain two or more double bonds whereby oxygen on exposure to air can be absorbed to give peroxides which catalyze the polymerization of the unsaturated portions.

Optional ingredients such as natural oils, release agents and solvents may also be used in the organic polyisocyanate component.

Although not preferred, organic solvents may be used in the organic polyisocyanate component and/or polyol component. If solvents are used in either, those skilled in the art will know how to select them. Typical organic solvents which are used include aromatic solvents, esters, or ethers, preferably mixtures of these solvents. Generally, these solvents are used in amounts less than about 30 weight percent based upon the weight of the organic polyisocyanate component, preferably less than 5 weight percent.

The binder is preferably made available as a two package system with the polyol component in one package, the organic polyisocyanate component in the second package. When making foundry mixes, usually the binder components are combined and then mixed with sand or a similar aggregate to form the foundry mix or the mix can be formed by sequentially mixing the components with the aggregate. Methods of distributing the binder on the aggregate particles are well-known to those skilled in the art. The mix can, optionally, contain other ingredients such as iron oxide, ground flax fibers, wood cereals, pitch, refractory flours, and the like.

The foundry mix is molded into the desired shape, whereupon it can be cured. Curing can be affected by passing a tertiary amine gas through the molded mix such as described in U.S. Pat. No. 3,409,579 which is hereby incorporated into this disclosure by reference. Typical gas times are from 0.5 to 3.0 seconds, preferably from 0.5 to 2.0 seconds. Purge times are from 1.0 to 15 seconds, and preferably from 1.0 to 10 seconds. Metal castings are made by pouring molten metal into and around an assembly of molds and/or cores made with the subject binders and sand.

ABBREVIATIONS

The following abbreviations are used in the examples:
BD=1,4-butane diol
BLE=benchlife extender
BOS=based on sand
CTR=control
EG=ethylene glycol
GLY=glycerine
PEG=polyethylene glycol
PPC=propylene carbonate
PG=1,2 propane diol
PPD=1,3 propane diol
RH=relative humidity
TEA=triethylamine
TMP=trimethyolpropane The same general procedures were used in all the examples. All parts are by weight and all temperatures are in ° C. unless otherwise specified. The controls did not use a polyol within the scope of this invention.

In order to carry out control experiments A–D and Examples 1–4, 4000 parts by weight of WEDRON 540 silica sand were mixed with the polyol component for about two minutes in a Hobart N-50 mixer. Then the polyisocyanate component was mixed in for about two minutes. The weight ratio of the polyol component to the polyisocyanate component was 20.8:79.2.

The polyol component used in the examples comprised
  (a) about 62.47 weight percent polyol,
  (b) about 21.45 weight percent water, and
  (c) about 16.09 weight percent propylene carbonate.

The polyisocyanate component used in the examples comprised:
  (a) about 35.84 weight percent MONDUR MR (a polymethylene polyphenyl isocyanate commercially available from MILES, INC.) having a functionality of 2.5 to 2.7., (b) about 35.14 weight percent MONDUR MR-200 commercially available from MILES, INC., (c) about 28.11 weight percent HI-SOL 15 (an aromatic solvent), and (d) 0.94 weight percent of A-187 silane.

The resulting foundry mixes were compacted into standard AFS dogbone shaped cores by blowing them into a core box. They were cured using the cold-box process as described in U.S. Pat. No. 3,409,579. In the examples which follow, the compacted mixes were then contacted with a mixture of TEA in nitrogen at 20 psi for 1.5 second, followed by purging with nitrogen that was at 60 psi for about 15.0 seconds, thereby forming AFS tensile test specimens (dog bones) using the standard procedure.

The tensile strength of the cured sand cores were measured immediately, 5 minutes, 1 hour, and 24 hours after gassing with TEA. The tensile strengths were also measured 24 hours after gassing and being stored at 100% relative humidity for 24 hours. No bench life extender was added to the polyisocyanate component. Table I shows the results for cores made with a sand mix having zero benchlife and 1.5 hours benchlife. Measuring the tensile strength of the dog bone shapes enables one to predict how the mixture of sand and binder will work in actual foundry operations.

the cores had better tensile strengths), particularly for cores made after the sand mix had aged for 1.5 hours.

Aluminum castings were also made with the sand mixes of Example 4 (containing ethylene glycol) and a comparison binder E (ISOCURE® AL 385/685 binder, a two part binder based upon a phenolic resin component and a polyisocyanate component, sold by Ashland Chemical Company, which contained aromatic organic solvents and is used to make molds and/or cores to make aluminum castings). Results indicated that the castings made with both of these binders were good to excellent in penetration, veining, and surface finish, but binder does not contain any phenol, formaldehyde, or aromatic solvents.

The data in Table II show the effect of varying the water content used in the polyol component where the polyol is ethylene glycol. The amounts of the components were the same as those for the Examples in Table I except for the amounts of ethylene glycol and propylene carbonate. The mix ratio of the polyol component to polyisocyanate component was 20.8:79.2.

In comparison example E, ISOCURE® AL 385/685 binder was again used for comparative purposes. Both of the resin and isocyanate component of the binder contain aromatic organic solvents. The weight ratio for the resin com-

TABLE I

TENSILE STRENGTH OF CORES MADE WITH BINDERS

| | | | ZERO BENCHLIFE | | | | | 1.5 HR. BENCHLIFE | | |
|---|---|---|---|---|---|---|---|---|---|---|
| EX. | POLYOL | PI/PII | IMM | 5 MIN | 1 HR | 24 HR | 24 RH | IMM | 1 HR | 24 HR |
| A | PEG 200 | 45.8:54.2 | 35 | 75 | 52 | 73 | 45 | COULD NOT MAKE DOGBONES[1] | | |
| B | PEG 300 | 55.8:44.2 | 12 | 21 | 10 | 20 | 10 | COULD NOT MAKE DOGBONES[1] | | |
| C | PG | 24.4:75.6 | | | COULD NOT MAKE DOGBONES[1] | | | | | |
| D | GLY | 20.8:79.2 | | | COULD NOT MAKE DOGBONES[1] | | | | | |
| 1 | TMP | 25.1:74.9 | 78 | 202 | 268 | 247 | | COULD NOT MAKE DOGBONES[1] | | |
| 2 | BD | 27.6:72.4 | 84 | 190 | 182 | 212 | 117 | COULD NOT MAKE DOGBONES[1] | | |
| 3 | PPD | 24.4:75.6 | 87 | 187 | 208 | 205 | 98 | 89 | 184 | 152 |
| 4 | EG | 20.8:79.2 | 170 | 240 | 229 | 183 | 42 | 184 | 208 | 171 |

[1]Benchlife of sand; mix was less than 1.5 hours.

The data in Table I indicate that the polyols used in the comparison examples (A–D) were not useful for making cores on a commercial scale and that the foundry mixes prepared with binders using these polyols did not result in foundry mixes that had adequate benchlife. Although all of the polyols used in Examples 1–4 showed much better results than those used in the comparison examples, ethylene glycol outperformed the polyols used in Examples 1–4 significantly (i.e. the foundry mixes had better benchlife and ponent to polyisocyanate component of ISOCURE® 385/685 binder was 55:45.

TABLE II

TENSILE STRENGTH OF CORES MODE WITH ETHYLENE GLYCOL AT VARYING WATER CONTENTS

| | | | | ZERO BENCHLIFE | | | | 1.5 HR BENCHLIFE | | |
|---|---|---|---|---|---|---|---|---|---|---|
| EXAMPLE | WATER | PPC | IMM | 5 MIN | 1 HR | 24 HR | 24 RH | IMM | 1 HR | 24 HR |
| 5 | 0 | 37.53 | 134 | 295 | 369 | 279 | 83 | COULD NOT MAKE DOGBONES[1] | | |
| 6 | 10.72 | 26.81 | 160 | 299 | 368 | 260 | 64 | COULD NOT MAKE DOGBONES[1] | | |
| 7 | 21.45 | 16.09 | 177 | 295 | 374 | 243 | 48 | 145 | — | 222 |
| 8 | 32.17 | 5.36 | 110 | 273 | 357 | 241 | 35 | COULD NOT MAKE DOGBONES[1] | | |
| E | 0 | 0 | 183 | 235 | 267 | 286 | 71 | 192 | — | 292 |

[1]Benchlife of sand mix was less than 1.5 hours.

The data in Table II show that the amount of water used in the formulation with the ethylene glycol is significant. Example 7 which used 21.45 weight percent in the polyol component gave the best overall results for zero benchlife and 1.5 hours benchlife. In fact it was better than the commercial formulation (E) at zero benchlife.

Shakeout tests were also run for the binders listed in Table II for aluminum castings. To evaluate shakeout, a core was prepared from a sand mix to use in the "shakeout test" described by W. L. Tordoff et al. in *AFS Transactions*, "Test Casting Evaluation of Chemical Binder Systems", Vol. 80-74, p. 157–158 (1980), which is hereby incorporated by reference.

According to this article, the measurements required to calculate percent shakeout are the initial core weight, the combined casting and retained core weight after vibration or tumbling, and the combined casting and core weight before vibration or tumbling. Shakeout percentage can be calculated by the following formula:

$$\% \text{ Shakeout} = \frac{(A-B)}{C} \cdot 100$$

where

A=casting and core weight before vibration,

B=casting and retained core weight after vibration, and

C=initial core weight.

The core assembly described in the article is shaped to house molten aluminum (about 700° C.) which will result in a 7 inch disk after cooling. The aluminum is poured into a sprue which leads to a gate which empties into the core assembly. After the aluminum has cooled and the disk has been formed, the sand from the core assembly is shaken out using a pneumatic vibrator.

The vibrator is clamped to the disk section of the casting midway between the disk circumference and the core center opening. The casting is positioned horizontally so as to facilitate the flow of the sand core from the casting. The casting is vibrated for intervals of fifteen seconds and the cumulative percentage of core weight removed is plotted versus time. The procedure is repeated with each test core and the data are compared to establish which core exhibits a faster rate of core removal.

The results of these tests are summarized in Table III which follows.

TABLE III

SHAKEOUT TESTS OF CORES MADE WITH ETHYLENE GLYCOL USED FOR ALUMINUM CASTINGS

| EXAMPLE | BINDER | SHAKEOUT TIME (MIN) | % SHAKEOUT |
|---|---|---|---|
| 9 | EXAMPLE 5 | ½ | 29.90 |
| | | 1 | 76.20 |
| | | 2 | 100.00 |
| | | 3 | |
| 10 | EXAMPLE 6 | ½ | 13.60 |
| | | 1 | 33.80 |
| | | 2 | 78.10 |
| | | 3 | 100.00 |
| 11 | EXAMPLE 7 | ½ | 21.60 |
| | | 1 | 41.80 |
| | | 2 | 100.00 |
| | | 3 | |
| H | EXAMPLE E | ½ | 9.90 |
| | | 1 | 21.40 |

TABLE III-continued

SHAKEOUT TESTS OF CORES MADE WITH ETHYLENE GLYCOL USED FOR ALUMINUM CASTINGS

| EXAMPLE | BINDER | SHAKEOUT TIME (MIN) | % SHAKEOUT |
|---|---|---|---|
| | | 2 | 32.50 |
| | | 3 | 100.00 |

The data in Table III indicate that the shakeout for the cores made with the binders of Examples 9–11 was better than the shakeout for the comparison binder E.

We claim:

1. A process for preparing a foundry shape by the cold-box process which comprises:

(a) mixing a major amount of a foundry aggregate with a binder composition wherein said binder composition contains less than five weight percent phenolic resin and comprises:

(1) a polyol component comprising a monomeric polyol having an average of at least two hydroxyl groups where at least one of said hydroxyl groups is a primary hydroxyl group and said primary hydroxyl group is separated by no more than four carbon atoms from another hydroxyl group; and (2) an organic polyisocyanate component;

(b) contacting the shaped foundry mix with a gaseous tertiary amine catalyst; and (c) removing the foundry shape of step (b) from the pattern.

2. The process of claim 1 wherein the polyol said foundry mix has an average of at least two hydroxyl and said polyol is selected from the group consisting of ethylene glycol, 1,3-propane diol, and 1,2,4-butane diol.

3. The process of claim 2 wherein the ratio of hydroxyl groups of the polyol to isocyanate groups of the polyisocyanate hardener in said foundry mix is from 0.90:1.1 to 1.1:0.90.

4. The process of claim 3 wherein the polyol of said foundry mix is ethylene glycol.

5. The process of claim 4 wherein the ethylene glycol is mixed water such that the weight ratio of ethylene glycol to water is from 1:1 to 3:1.

6. The process of claim 5 wherein the amount of said binder composition is about 0.6 percent to about 5.0 percent based upon the weight of the aggregate.

7. A process of casting a metal which comprises:

(a) preparing a foundry shape in accordance with claim 3;

(b) pouring said metal while in the liquid state into and a round said shape;

(c) allowing said metal to cool and solidify; and (d) then separating the molded article.

8. A process of casting a metal which comprises:

(a) preparing a foundry shape in accordance with claim 4;

(b) pouring said metal while in the liquid state into and a round said shape;

(c) allowing said metal to cool and solidify; and (d) then separating the molded article.

9. A process of casting a metal which comprises:

(a) preparing a foundry shape in accordance with claim 5;
(b) pouring said metal while in the liquid state into and around said shape;
(c) allowing said metal to cool and solidify; and
(d) then separating the molded article.

10. A process of casting a metal which comprises:
(a) preparing a foundry shape in accordance with claim 6;
(b) pouring said metal while in the liquid state into and around said shape;
(c) allowing said metal to cool and solidify; and
(d) then separating the molded article.

* * * * *